United States Patent Office 3,442,871
Patented May 6, 1969

---

3,442,871
PROCESS FOR POLYMERIZING A GLYCOLIDE
Edward Emil Schmitt, Norwalk, and Martin Epstein, Stamford, Conn., and Rocco Albert Polistina, Port Chester, N.Y., assignors to American Cyanamid Company, Stamford, Conn., a corporation of Maine
No Drawing. Filed May 4, 1966, Ser. No. 547,449
Int. Cl. C08g *17/02*
U.S. Cl. 260—78.3                               10 Claims

---

ABSTRACT OF THE DISCLOSURE

A process for polymerizing a substantially pure glycolide composition in the presence of certain stated mol percentages of certain alcohols and certain percentages by weight of $SnCl_2 \cdot 2H_2O$ under certain temperature and related time conditions.

---

This invention relates to a process for polymerizing a glycolide comprising heating a mixture of (1) a substantially pure glycolide composition, (2) from about 0.05 to 1.5 mole percent based on the moles of said glycolide composition of an alcohol free of non-benzenoid unsaturation and free of any reactive groups other than alcoholic hydroxy groups, and (3) from about 0.0005% to about 0.0025%, by weight, based on the weight of said glycolide composition of $SnCl_2 \cdot 2H_2O$ at a temperature between about 210° C. and 245° C. for a period of time varying inversely between about 120 minutes and 50 minutes. Still further, this invention relates to a process for polymerizing the aforementioned glycolide composition in an admixture using a compound containing an alcoholic hydroxy group under the conditions indicated in order to produce a polymeric melt which is extrudable in a filamentary form so as to provide a material as a synthetic suture.

One of the objects of the present invention is to provide a process for polymerizing a substantially pure glycolide composition in the presence of an initiator or accelerator in the nature of a compound containing at least one alcoholic hydroxy group so as to provide a polymeric material with controlled molecular weight. A further object of the present invention is to provide a substantially pure glycolide composition by the process of the present invention in which a melt is produced which can be readily convertable by spinning through one or more orifices of a spinnerette so as to provide a filamentary material particularly useful as a synthetic absorbable suture material. These and other objects of the present invention will be discussed in greater detail hereinbelow.

Fibers may be fabricated from the polymers of the present invention produced from substantially pure glycolide compositions, which polymers may be varied over a broad range of molecular weights and, hence, over a broad range of melt viscosities. Selected fibers chosen within this range display differences in certain physical properties which probably include differences in the rate of absorption in the animal body of a suture made of this material.

Therefore, depending on the properties desired in the ultimate fiber, it is important and necessary that melt viscosity be controlled within selectively narrow ranges. The ultimate viscosity of the polymerizing system may be controlled to within a few hundred poises over the useable fiber viscosity range of 200 to 100,000 poises by the addition of the proper amount of an alcohol, between the rather narrow limits of .05 and 1.50 mole percent based on the moles of glycolide in the reaction mixture which contains .0005% to .0025%, by weight, of stannous chloride dihydrate.

For example, if it is desired to produce a polymer which possesses a melt viscosity of 2,000±200 poises, the amount of lauryl alcohol or other monofunctional alcohol that is added is about 0.69 mole percent.

The glycolide composition of the present invention is a substantially pure composition that consists essentially of α-glycolide and/or β-glycolide. The α-glycolide and its method of preparation are fully described in our copending application having the United States Ser. No. 484,110, filed Aug. 31, 1965 now abandoned. The β-glycolide and its method of preparation are similarly fully disclosed in our United States application Ser. No. 484,111, also filed on Aug. 31, 1965 now abandoned.

It is within the contemplation of the present invention to utilize the α-glycolide alone or the β-glycolide alone, or mixtures of the α- and β-glycolide as the substantially sole components of the substantially pure glycolide composition. Even when the α-glycolide alone is used in the practice of the process of the present invention, there is the possibility and likelihood, under the conditions of the process, that at least some of the α-glycolide is converted to the β-glycolide during the polymerization. Collaterally, when the β-glycolide is used as the sole component in the glycolide composition of the present invention, there is the possibility that at least some of the β-glycolide will become converted to the α-glycolide during the course of the polymerization. The glycolide composition used in the present invention can be derived by first reacting glycolic acid with itself so as to form a ring structure generally identified as glycolide. In the preparation of the glycolide per se, impurities of unknown identity are produced by side reactions. These side reaction products need to be removed from the composition before the process of the present invention is undertaken. There are a plurality of different processes by which the impurities may be removed, and it is deemed sufficient to indicate that one of the methods for purifying the glycolide material is by recrystallization as will be indicated hereinbelow.

In carrying out the process of the present invention, it is necessary in order to control the molecular weight during the polymerization to make use of very limited amounts of a polymerization initiator which is also referred to as a polymerization accelerator and/or as a polymerization controller of melecular weight. In some respects, it is believed that these initiators function as a chain terminator. These initiators are any one of a number of alcohols which are free of non-benzenoid unsaturation and are also free of reactive groups other than alcoholic hydroxy groups. Included in the group of alcoholic compounds are the monohydric and polyhydric aliphatic alcohols as well as the monohydric and polyhydric aromatic alcohols. Excluded from the group of alcohols are those alcohols which contain polymerizably reactive double bonds which would tend to interfere with the molecular weight control to which the process of the present invention is directed. Excluded are those alcohols represented by the species allyl alcohol and methallyl alcohol. Also excluded from the group of alcoholic compounds are those which contain reactive groups other than alcoholic hydroxy groups such as carboxyl groups, amino groups, and the like. The purpose for excluding these compounds having these other reactive groups is because they too may enter into reaction during the polymerization process and thereby diminish the control which the present process provides over the molecular weight range. The amount of the compound containing the alcoholic hydroxy group or groups which is used in the process of the present invention may be varied between about 0.05 to 1.5 mole percent, based on the total moles of the substantially pure glycolide composition and, preferably, between 0.2 to 0.8 mole percent when monoalcohols are used, 0.13 to 0.6 mole percent when di-alcohols are used, 0.08 to 0.4 mole percent when tri-alcohols are used, 0.05 to 0.2 mole percent when tetra-alcohols and higher alcohols are used.

Among the alcohols which may be used in the amounts stated hereinabove in the practice of the process of the present invention are methyl alcohol, ethyl alcohol, propyl alcohols, butyl alcohols, amyl alcohols, hexyl alcohols, heptyl alcohols, octyl alcohols, nonyl alcohols, decyl alcohols, undecyl alcohols and, particularly, lauryl alcohol, dodecyl alcohol, tridecyl alcohols and stearyl alochols or aromatic alcohols such as benzyl alcohol, and the like. It is to be noted that each of the species recited hereinabove are monohydric alcohols. However, the polyhydric alcohols, including the dihydric alcohols, may also be used in the amounts set forth hereinabove. Included in this latter group are such polyhydric alcohols as ethylene glycol, propylene glycol, butanediol-1,4, diethylene glycol, dipropylene glycol, glycerol, pentaerythritol, dipentaerythritol, adonitol, mannitol, trimethylol propane, trimethylol ethane, sorbitol, trimethylene glycol, tetramethylene glycol, pinacol, arabitol, benzyl alcohol, xylitol, and the like.

In the practice of the process of the present invention, one can operate at atmospheric pressure, subatmospheric pressure or superatmospheric pressure. When comparatively low boiling alcohols are used such as methanol and ethanol, for example, it may be necessary to utilize superatmospheric pressure since the reaction temperature will be significantly above the boiling point of these lower aliphatic alcohols and it may, therefore, be necessary to operate at increased pressure in a closed system in order to maintain the alcohol in contact with the substantially pure glycolide composition in order that it can function, in turn, as a polymerization initiator, a polymerization accelerator and a polymerization controller. Of all of the alcohols which may be used in the practice of the present invention, it is preferred to use the saturated aliphatic monohydric alcohols which have between 6 and 14 carbon atoms, inclusive. We have found that we realize the best results by utilizing lauryl alcohol in the amounts stated hereinabove. If desired, one may make use of a plurality of these alcohols in admixture with one another and if such a mixture of alcohols is used, the total amount of the mixture of the alcohols must fall within the amounts of mole percentages based on the total moles of said glycolide composition set forth hereinabove.

In the practice of the present invention, a polymerization catalyst is used in exceedingly small amounts, namely, between about 0.0005% and 0.0025%, by weight of.

$$SnCl_2 \cdot 2H_2O$$

based on the total weight of the substantially pure glycolide composition. It is preferred to use about 0.00125%, by weight, of the $SnCl_2 \cdot 2H_2O$, same basis.

In practicing the process of the present invention, the mixture of the substantially pure glycolide composition and the alcoholic group compound and the stannous chloride dihydrate are blended together in a suitable reaction vessel and the material is heated rapidly to about 210° C. and held within the range of 210° C. to about 245° C. for a period of time varying inversely with temperature between about 120 minutes and 50 minutes. It is preferred to use temperatures varying between about 220° C. and about 230° C. for a period of time varying inversely with temperature from between about 90 minutes to about 60 minutes.

If too little stannous chloride dihydrate is utilized in the process of the present invention, namely, in an amount sufficiently lower than 0.0005%, by weight, the polymerization is exceedingly slower and the molecular weight developed is too low to be of commercial importance in the ultimate use of the polymer produced, namely, in the spinning of filaments having the ultimate properties desired in a synthetic suture material such as initial tensile strength, knot strength, knottability, good handleability, and the capability of retaining a high proportion of its tensile strength for at least three and, preferably, as much as fifteen days when embedded in living muscular tissue, and yet being capable of being substantially completely absorbed in ninety days when embedded in living muscular tissue. By the same token, if the amount of the stannous chloride dihydrate used is significantly above the upper limit of the amount used in the process of the present invention, namely, above 0.0025% by weight, the polymerization proceeds too rapidly and is exceedingly difficult to control resulting in a substantially sudden molecular weight build up followed very shortly thereafter by a molecular weight decline or degradation which indicates that some significant measure of depolymerization has taken place which renders such use of larger amounts exceedingly undesirable. These shortcomings of too small and too large amounts of the stannous chloride dihydrate is particularly emphasized if there is no alcoholic compound of the class described hereinabove present in the system in the exceedingly small amounts stated, namely, between about 0.05 and 1.5 mole percent of the alcoholic compound based on the moles of the substantially pure glycolide. Of collateral interest, the presence of the alcoholic compound, as has been indicated hereinabove, appears to have a plurality of functions in the process of the present invention. At the outset, the alcohol appears to function as an initiator of the polymerization. In other words, the presence of the small amounts of the alcoholic compound appears to get the polymerization reaction started. Once the polymerization reaction has commenced, the alcoholic compound then appears to accelerate the polymerization to the desired molecular weight level and, at that point, the molecular weight holds substantially constant which is an indication that the alcoholic compound in the last stages of the polymerization reaction is acting as a molecular weight controller, which appears to prevent depolymerization as well as further molecular weight build up to a polymer having too high a molecular weight but instead resulting in a product which is theorized to contain alcoholic compound moieties attached to the polymer chains and/or rings as chain terminators.

The following example illustrates a method for the preparation of glycolide (a mixture of the α-glycolide and the β-glycolide) and the purification thereof to produce a substantially pure glycolide composition. All parts are parts, by weight, unless otherwise indicated.

Example A

Into a suitable reaction vessel there is charged 400 parts of a commercial glycolic acid which is then heated from room temperature to about 200° C. over a period of about four hours. When the pot temperature has reached 185° C., the pressure of the system is reduced from atmospheric pressure to 15 mm. of Hg, causing the water of condensation and/or esterification to distill off. The residue is allowed to cool and is pulverized into about 280 parts of a powder which is then added in small increments to a suitable pyrolysis chamber maintained at a temperature of about 250–285° C. at a pressure of less than 15 mm. of Hg. The distillate which weighed about 238 parts is dissolved in a minimum amount of hot ethyl acetate, and after decolorizing and purifying with active carbon, the distillate is recrystallized from the above solution to provide 160 parts of product having a melting point of about 82.5–84.0° C. The infrared spectrum confirms that the product is substantially identical to the substantially pure glycolide composition.

The following example illustrates how the substantially pure glycolide prepared according to the process hereinabove is polymerized in the presence of an alcohol free of non-benzenoid unsaturation and free of any reactive groups other than alcoholic hydroxy groups and in the presence of $SnCl_2 \cdot 2H_2O$. These examples are set forth primarily for the purpose of illustration and any specific enumeration of detail contained therein should not be interpreted as a limitation on the case except as is indicated in the appended claims. All parts are parts, by weight, unless otherwise specified.

Example 1

Into a heavy walled glass tube having a bore of about 3/10" and sealed at one end is charged with 3 parts of substantially pure glycolide composition, 0.04 part of a 0.1% ether solution of $SnCl_2 \cdot 2H_2O$ (about 0.0013% of $$SnCl_2 \cdot 2H_2O$$

based on the weight of the substantially pure glycolide composition), 0.0166 part of lauryl alcohol (0.346 mole percent based on the moles of the substantially pure glycolide composition), and a magnetic steel ball 5/32" in diameter. The tube is evacuated and purged with argon. The tube is evacuated again to a vacuum of less than 1 mm. of Hg and the top is sealed. The reaction tube is placed in a vertical position in a closed glass chamber throughout which dimethyl phthalate is refluxed at 222° C. The boiling point of the dimethyl phthalate is controlled by decreasing the pressure of the system. At periodic intervals after melting, the viscosity of the reaction mixture is measured by raising the steel ball by means of a magnet and measuring the rate of the fall of the ball in sec./in. Ninety minutes after the melt is first achieved, the ball drop time is 550 sec./in. or about 7,200 poises, and after 120 minutes, the ball drop time is 580 sec./in. or about 7,600 poises.

The rate of the fall of the ball is a significant tool in determining the viscosity of the polymeric material and it is related to the molecular weight of the polymerized glycolide composition.

Furthermore, the period of fall or ball drop time is related to the conventional melt viscosity units (poises). The viscosity measurements achieved in the examples set forth hereinabove are based upon Stokes law. Stokes law relates velocity ($\mu$) of a falling ball with the viscosity ($\eta$) of the medium through which it falls.

$$\mu = \frac{2gr^2(p-p')}{9\eta}$$

where $g$ = acceleration due to the force of gravity.
$p$ = density of the sphere.
$p'$ = density of the medium.
$r$ = radius of the sphere.

When the differences between the radius of the sphere and the radius of the vessel or tube which contain the medium are small, a correction factor of $$1 + \frac{2.4r}{\frac{1}{2}D}$$

where D is the internal diameter of the cylinder, must be used to modify the velocity.

Furthermore, when the length of fall is not very much greater than the radius of the falling sphere, another correction factor must be used.

$$1 + \frac{3.1r}{L}$$

The corrected equation thus appears as $$\mu\left(1 + \frac{2.4r}{\frac{1}{2}D}\right)\left(1 + \frac{3.1r}{L}\right) = \frac{2gr^2(p-p')}{9\eta}$$

and was used by us to determine the melt viscosity from ball drop times.

Solving the equation for viscosity ($\eta$) and substituting in the rearranged equation the relationship, $$T = 1/\mu$$

where T = time in seconds for the ball to travel one inch, one can simplify the expression to read, $$\eta = KT$$

where K is a combined constant.

In these tests, use is made of a glass tube of 0.30" internal diameter, a steel ball of 5/32" diameter, and a density of 7.75 grams/cc. The value of K in all our examples is equal to 13.13 grams/cm. sec.$^2$.

Employing the above constants and deductive reasoning, it has been shown that a direct proportion exists between the measured ball drop time and the conventional melt viscosity units. For these experiments, the melt viscosity in poises is merely equal to the product of the ball drop time (sec.) and 13.13.

Following the procedure outlined hereinabove in Example 1, Examples 2–21 were conducted with the parts of the substantially pure glycolide as is indicated in the following table, together with the percentages of the $SnCl_2 \cdot 2H_2O$, the kind, amount, mole percent of the alcohol, the reaction temperature and the viscosity in poises as measured by the fall of the steel ball for 90 minutes and 120 minutes.

TABLE

| Example | Parts of glycolide | Percent $SnCl_2 \cdot 2H_2O$ | Type of alcohol | Parts of alcohol | Mole percent of alcohol | Reaction Temperature (° C) | Viscosity (poises) 90 min. | Viscosity (poises) 120 min. |
|---|---|---|---|---|---|---|---|---|
| 2 | 3.0 | 0.0013 | Lauryl alcohol | 0.01 | 0.209 | 220 | 10,500 | 11,800 |
| 3 | 3.0 | 0.0013 | do | 0.013 | 0.277 | 220 | 11,150 | 11,250 |
| 4 | 3.0 | 0.0013 | do | 0.02 | 0.410 | 220 | 6,250 | 6,450 |
| 5 | 3.0 | 0.0013 | do | 0.023 | 0.488 | 220 | 3,750 | 3,950 |
| 6 | 3.0 | 0.0013 | do | 0.034 | 0.69 | 220 | 2,100 | 1,970 |
| 7 | 3.0 | 0.0013 | do | 0.068 | 1.38 | 220 | 200 | 200 |
| 8 | 3.0 | 0.00065 | do | 0.02 | 0.410 | 220 | 3,450 | 4,300 |
| 9 | 3.0 | 0.00098 | do | 0.02 | 0.41 | 220 | 5,250 | 5,850 |
| 10 | 3.0 | 0.00195 | do | 0.02 | 0.41 | 220 | 7,900 | 7,550 |
| 11 | 3.0 | 0.0025 | do | 0.0024 | 0.05 | 220 | 92,000 | 90,000 |
| 12 | 3.0 | 0.0025 | do | 0.0036 | 0.075 | 220 | 74,500 | 75,500 |
| 13 | 3.0 | 0.0025 | do | 0.0048 | 0.10 | 220 | 53,000 | 55,000 |
| 14 | 3.0 | 0.0025 | do | 0.0060 | 0.125 | 220 | 35,000 | 34,500 |
| 15 | 1.5 | 0.0013 | Hexyl alcohol | 0.00656 | 0.426 | 220 | 3,800 | 3,150 |
| 16 | 1.5 | 0.0013 | do | 0.0131 | 0.852 | 220 | 2,650 | 2,850 |
| 17 | 1.5 | 0.0013 | Cyclohexanol | 0.0076 | 0.595 | 220 | 3,450 | 3,750 |
| 18 | 1.5 | 0.0013 | do | 0.0152 | 1.19 | 220 | 590 | 590 |
| 19 | 1.5 | 0.0013 | Diethylene glycol | 0.0056 | 0.405 | 220 | 1,050 | 1,000 |
| 20 | 1.5 | 0.0013 | Trimethylol ethane | 0.002 | 0.13 | 220 | 20,000 | 21,000 |
| 21 | 1.5 | 0.0013 | Pentaaerythritol | 0.001 | 0.058 | 220 | 15,500 | 15,100 |

We claim:

1. A process for polymerizing a glycolide comprising heating a mixture of a substantially pure glycolide composition, from about 0.05 to 1.5 mole percent based on the moles of said glycolide composition of an alcohol free of non-benzenoid unsaturation and devoid of any reactive groups other than alcoholic hydroxy groups, and from about 0.0005% to about 0.0025%, by weight, based on the weight of said glycolide composition of $$SnCl_2 \cdot 2H_2O$$

at a temperature between about 210° C. and 245° C. for a period of time varying inversely between about 120 minutes and 50 minutes.

2. The process according to claim 1 in which the alcohol is a saturated aliphatic monohydric alcohol having between 6 and 14 carbon atoms.

3. The process according to claim 1 in which the alcohol is lauryl alcohol.

4. The process according to claim 1 in which the amount of the alcohol is between about 0.2% and 0.8 mole percent, based on the moles of the glycolide composition and the amount of the $SnCl_2 \cdot 2H_2O$ is about 0.00125 weight percent.

5. The process according to claim 1 in which the temperature is between about 220° C. and 230° C. for a period of time varying inversely between about 90 minutes and 60 minutes.

6. The process according to claim 4 in which the alcohol is a saturated aliphatic monohydric alcohol having between 6 and 14 carbon atoms.

7. The process according to claim 6 in which the alcohol is lauryl alcohol.

8. The process according to claim 5 in which the amount of the alcohol is between about 0.2% and 0.8 mole percent based on the moles of the glycolide composition and the amount of the $SnCl_2 \cdot 2H_2O$ is about 0.00125 weight percent.

9. The process according to claim 8 in which the alcohol is a saturated aliphatic monohydric alcohol having between 6 and 14 carbon atoms.

10. The process according to claim 9 in which the alcohol is lauryl alcohol.

References Cited

UNITED STATES PATENTS

| | | | |
|---|---|---|---|
| 2,668,162 | 2/1954 | Lowe | 260—78.3 |
| 2,951,828 | 9/1960 | Zeile et al. | 260—78.3 |
| 3,190,858 | 6/1965 | Cox et al. | 260—78.3 |
| 3,268,487 | 8/1966 | Klootwijk | 260—78.3 |

JAMES A. SEIDLECK, *Primary Examiner.*

U.S. Cl. X.R.

260—340.2